(12) United States Patent
Buchmann

(10) Patent No.: US 11,327,983 B2
(45) Date of Patent: May 10, 2022

(54) REDUCING CPU CONSUMPTION IN A FEDERATED SEARCH

(71) Applicant: SAP SE, Walldorf (DE)

(72) Inventor: Daniel Buchmann, Karlsruhe (DE)

(73) Assignee: SAP SE, Walldorf (DE)

(*) Notice: Subject to any disclaimer, the term of this patent is extended or adjusted under 35 U.S.C. 154(b) by 234 days.

(21) Appl. No.: 16/216,542

(22) Filed: Dec. 11, 2018

(65) Prior Publication Data
US 2020/0183927 A1 Jun. 11, 2020

(51) Int. Cl.
*G06F 16/2458* (2019.01)
*G06F 16/248* (2019.01)
*G06F 16/33* (2019.01)
*G06F 16/245* (2019.01)

(52) U.S. Cl.
CPC ........ *G06F 16/2471* (2019.01); *G06F 16/248* (2019.01); *G06F 16/24569* (2019.01); *G06F 16/3349* (2019.01)

(58) Field of Classification Search
CPC ............ G06F 16/9535; G06F 16/2455; G06F 16/2428; G06F 16/2471; G06F 16/248; G06F 16/3349; G06F 16/24569; G06F 16/24532; G06F 16/256
See application file for complete search history.

(56) References Cited

U.S. PATENT DOCUMENTS

| | | | |
|---|---|---|---|
| 7,797,635 B1* | 9/2010 | Denise | G06F 16/9038 715/738 |
| 2005/0132018 A1* | 6/2005 | Milic-Frayling | G06F 16/955 709/213 |
| 2005/0165777 A1* | 7/2005 | Hurst-Hiller | G06F 16/2471 |
| 2007/0208714 A1* | 9/2007 | Ture | G06F 16/951 |
| 2008/0263022 A1* | 10/2008 | Kostorizos | G06F 16/951 |
| 2010/0023493 A1* | 1/2010 | Douglis | G06F 9/451 707/E17.108 |
| 2010/0169304 A1* | 7/2010 | Hendricksen | G06F 16/319 707/723 |
| 2012/0054533 A1* | 3/2012 | Shi | G06F 11/2097 714/4.1 |
| 2014/0379924 A1* | 12/2014 | Das | H04L 47/72 709/226 |
| 2016/0269473 A1* | 9/2016 | Bhogal | H04L 67/22 |
| 2018/0025089 A1* | 1/2018 | Chin | G06F 16/9535 707/706 |

* cited by examiner

*Primary Examiner* — Etienne P Leroux
(74) *Attorney, Agent, or Firm* — Schwegman Lundberg & Woessner, P.A.

(57) ABSTRACT

Techniques for reducing CPU consumption in a federated search are disclosed. In some example embodiments, a computer-implemented method comprises determining an initial search scope by selecting a subset of searchable resources from a plurality of searchable resources based on interaction data of a user, with the initial search scope being defined by the selected subset of searchable resources, and the interaction data indicating online activity of the user directed towards past search results of past search queries submitted by the user. A federated search for a current search query is then performed using the initial search scope, with the federated search for the current search query being restricted to only the subset of searchable resources, and current search results for the current search query are generated based on the performing of the federated search.

20 Claims, 10 Drawing Sheets

REDUCING CPU CONSUMPTION IN A FEDERATED SEARCH

TECHNICAL FIELD

The present application relates generally to the technical field of data transfer within an electrical computer system architecture, and, in various embodiments, to systems and methods for reducing central processing unit (CPU) consumption in a federated search.

BACKGROUND

Over the years, search has evolved more and more into a crucial integration technology, enabling central access to all data relevant to a specific user. But, the more data sources and the more data providers that are available and integrated, the more challenging it becomes to effectively and efficiently implement search solutions. A federated search across several searchable data resources makes heavy use of parallelization, so that, ideally, if each searchable data resource has the same response time, then the overall search response time is independent of the number of involved searchable data resources. However, parallelization does not reduce CPU consumption, which scales directly with the number of searchable resources, making search a costly application. As a result, computer systems that provide federated search capabilities suffer from a technical problem of, amongst other technical problems, inefficient and excessive CPU consumption, which significantly diminishes the functioning of the computer system.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
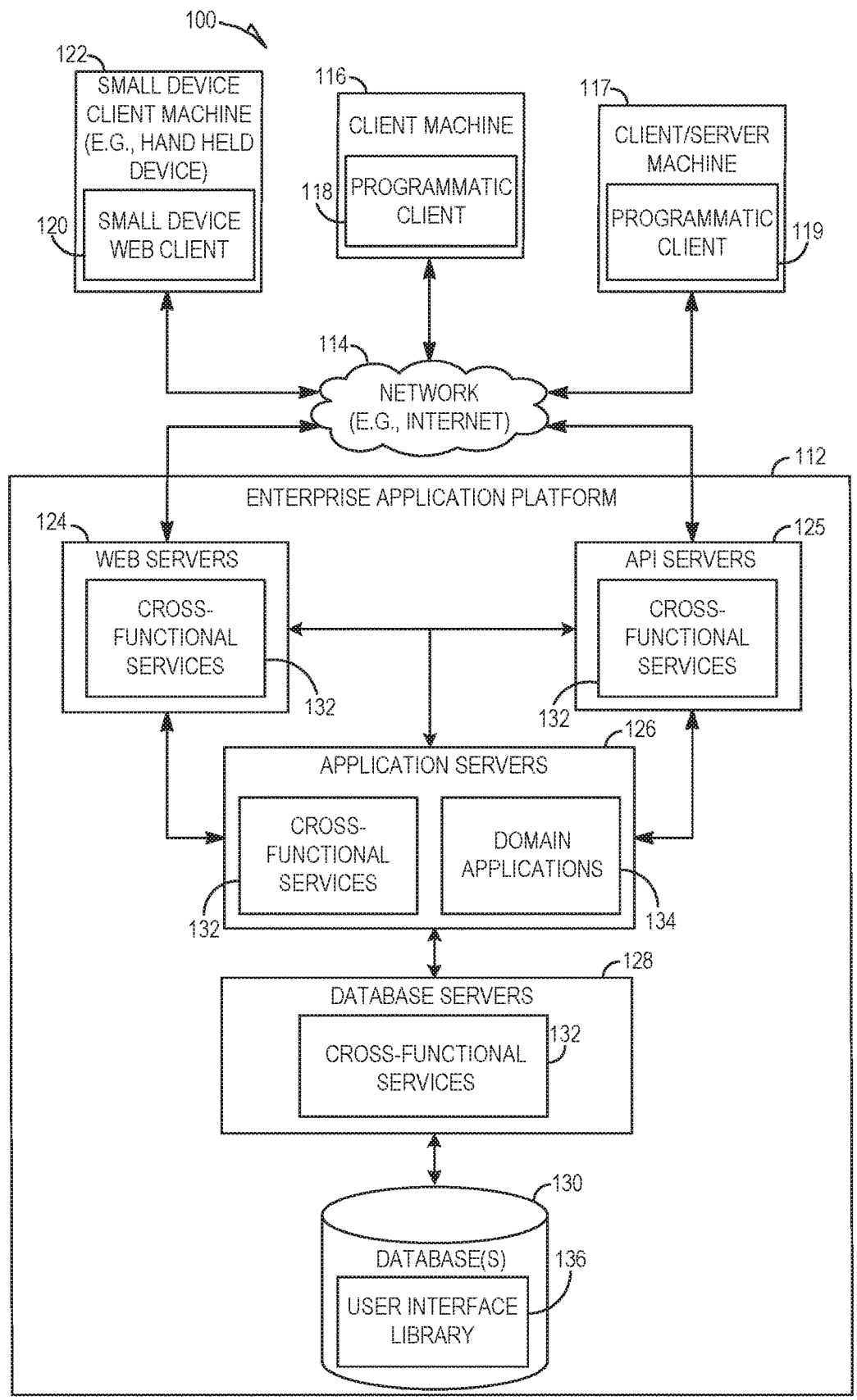
FIG. 1 is a network diagram illustrating a client-server system, in accordance with some example embodiments.

Example methods and systems for reducing CPU consumption in a federated search are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a query federator is configured to reduce CPU consumption in a federated search by restricting the scope of the federated search, such as by determining a select set of searchable resources to use for the federated search, based on interaction data of the user for whom the federated search is being performed. The query federator uses the interaction data to personalize the scope of the federated search, such as by considering certain aspects indicated by the interaction data that are used to identify which searchable resources are the most relevant to the user. Examples of such aspects indicated by the interaction data include, but are not limited to, which searchable resources the user previously used to narrow down past search results and for which searchable resources did the user previously navigate to documents of corresponding search results. In some example embodiments, the query federator also uses other factors to determine the scope of the federated search for the user, including, but not limited to, a role of the user, minimum and maximum values for the number of searchable resources, CPU consumption values for the searchable resources, and response times for the searchable resources.

One technical effect of the system and method of the present disclosure is to reduce the CPU consumption associated with a federated search. As a result, the functioning of the computer system performing the federated search is improved. Furthermore, the accuracy and relevancy of the search results provided by the federated search are increased. Additionally, other technical effects that improve the functionality of computer systems will be apparent from this disclosure as well.

In some example embodiments, a computer-implemented method comprises: determining an initial search scope for a user based on interaction data of the user, the determining the initial search scope comprising selecting a subset of searchable resources from a plurality of searchable resources based on the interaction data of the user, the initial search scope being defined by the selected subset of searchable resources, the interaction data indicating online activity of the user directed towards past search results of past search queries submitted by the user; performing a federated search for a current search query using the initial search scope, the federated search for the current search query being restricted to only the subset of searchable resources; generating current search results for the current search query based on the performing of the federated search; and causing the generated current search results to be displayed on a computing device of the user. In some example embodiments, the plurality of searchable resources comprises a plurality of search engines or a plurality of file systems.

In some example embodiments, the online activity comprises narrowing down the past search results of the past search queries by one or more searchable resources. In some example embodiments, the narrowing down the past search results comprises removing all search results from the past search results that were retrieved from the one or more searchable resources. In some example embodiments, the narrowing down the past search results comprises removing all search results from the past search results that were not retrieved from the one or more searchable resources.

In some example embodiments, the online activity comprises, for each one of the past search results, navigating to a document corresponding to the past search result via a user selection by the user of a selectable link corresponding to the past search result, the past search result having been retrieved from one of the subset of searchable resources.

In some example embodiments, the determining the initial search scope of the user is performed prior to the user submitting the current search query as part of a periodic search scope determination process, and the determining the initial search scope of the user comprises storing the initial search scope of the user in a database in association with the user, and the performing the federated search for the current search query comprises retrieving the initial search scope. In some example embodiments, the determining the initial search scope of the user is performed in response to the user submitting the current search query.

In some example embodiments, the operations further comprise: receiving an indication of online activity of the user directed towards one of the generated current search results displayed on the computing device of the user; storing the indication of the online activity directed towards the one of the generated current search results as additional interaction data in a database in association with the user; determining another initial search scope for the user, the other initial search scope being defined by another subset of searchable resources that have been selected from the plurality of searchable resources based on the additional interaction data of the user; performing another federated search for another current search query using the other initial search scope, the other federated search for the other current search query being restricted to only the other subset of searchable resources; generating another set of current search results for the other current search query based on the performing of the other federated search; and causing the other set of generated current search results to be displayed on the computing device of the user.

In some example embodiments, the selecting the subset of searchable resources is further based on a role of the user. In some example embodiments, the selecting the subset of searchable resources comprises restricting a number of searchable resources defining the subset of searchable resources to being within a range of a minimum value and a maximum value, with the minimum value being greater than one and the maximum value being less than a total number of searchable resources in the plurality of searchable resources. In some example embodiments, the selecting the subset of searchable resources is further based on corresponding central processing unit (CPU) consumption values for the subset of searchable resources. In some example embodiments, the selecting the subset of searchable resources is further based on corresponding response times for the subset of searchable resources.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-9.

Figure 2:
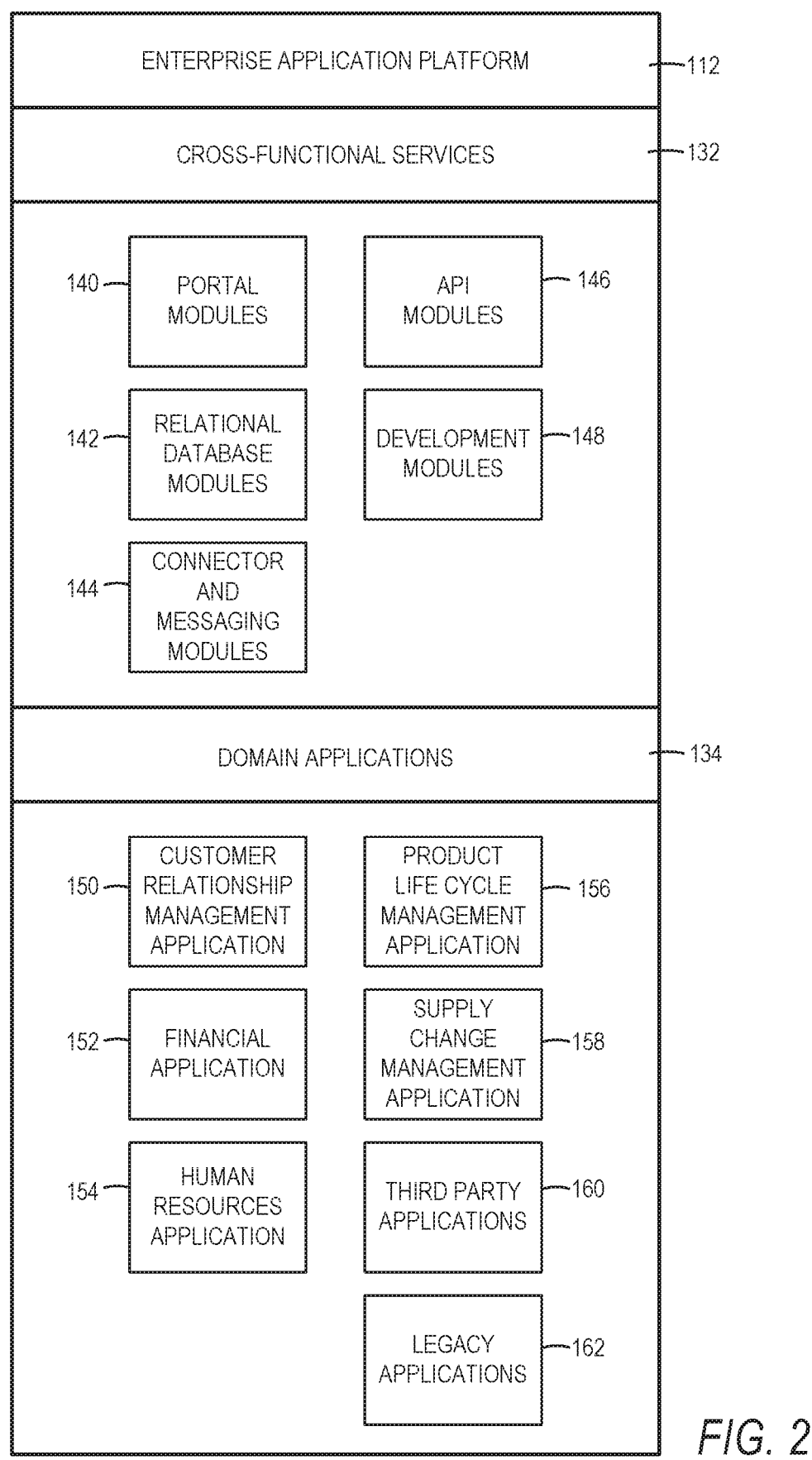
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JARS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, My SQL, Unicode, JDBC, or the like.

The connector and messaging modules 144 can enable communication across different types of messaging systems that are utilized by cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
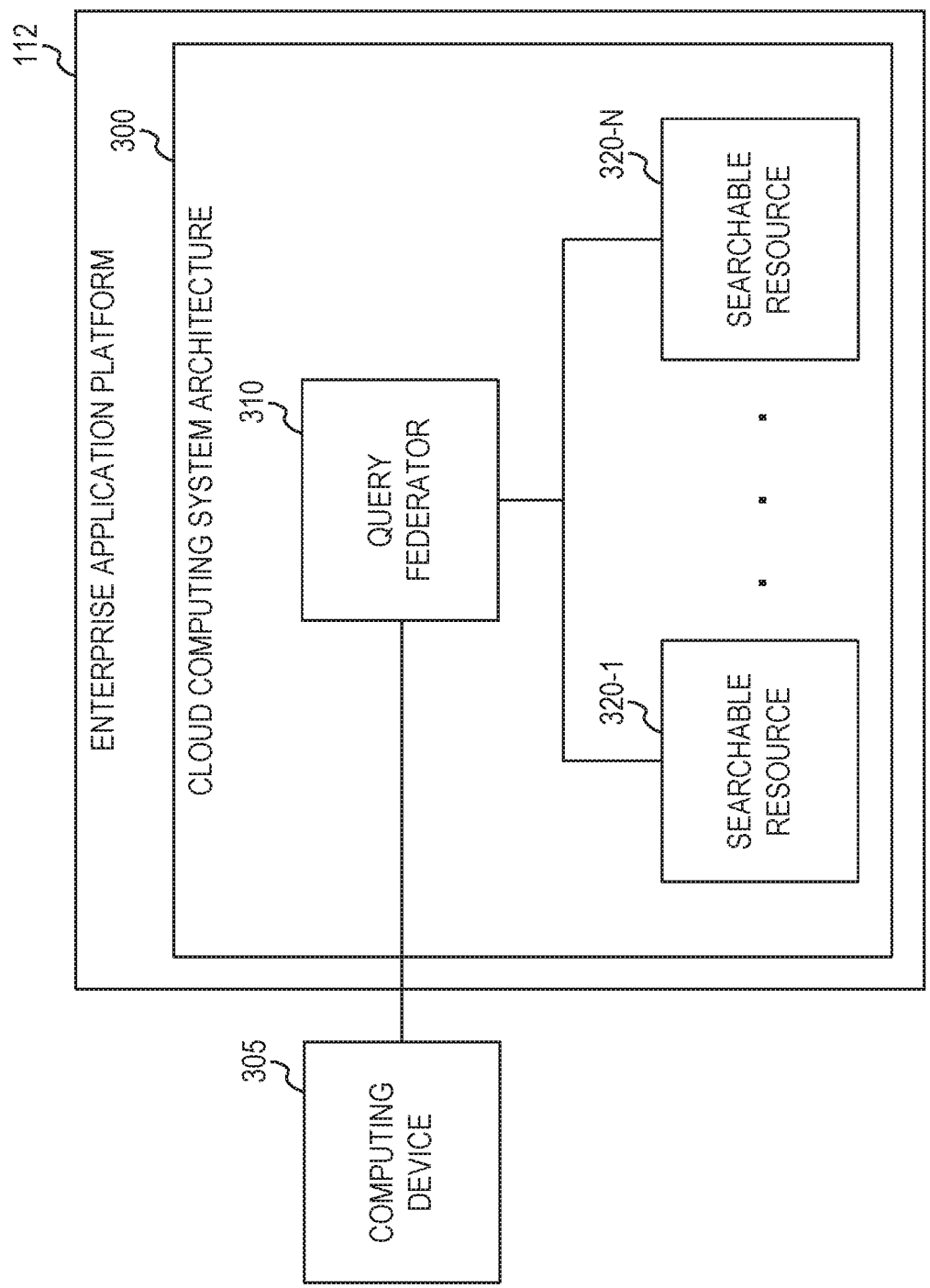
FIG. 3 is a block diagram illustrating a cloud computing system architecture in which CPU consumption in a federated search is reduced, in accordance with some example embodiments.

FIG. 3 is a block diagram illustrating a cloud computing system architecture 300 in which CPU consumption in a federated search is reduced, in accordance with some example embodiments. In some example embodiments, the components of the cloud computing system architecture 300 reside on the same machine, while in other example embodiments, some of the different components of the cloud computing system architecture 300 reside on separate remote machines that communicate with each other via a network (e.g., network 114 in FIG. 1). In some example embodiments, the cloud computing system architecture 300 is incorporated into the enterprise application platform 112 in FIG. 1 (e.g., on application server(s) 126). However, it is contemplated that other configurations are also within the scope of the present disclosure.

In some example embodiments, the cloud computing system architecture 300 comprises a query federator 310 that is configured to perform a federated search for a user of a computing device 305 in response to a search query submitted by the user via the computing device 305. A federated search is an information retrieval technology that allows the simultaneous search of multiple searchable resources 320, where a user makes a single query request that is distributed to the searchable resources 320 (e.g., search engines, databases or other query engines) participating in the federation.

Although the query federator 310 is shown in FIG. 3 and discussed in the present disclosure within the context of the cloud computing system architecture 300, the query federator 310 may be implemented within other computing architectures and environments as well, such as in an on-premises architecture. The computing device 305 may comprise any of the client devices/machines 116, 117, or 122 of FIG. 1. For example, the computing device 305 may comprise a desktop computer, a laptop computer, a tablet computer, smartphone, or a wearable computing device. However, other types of computing devices 305 are also within the scope of the present disclosure.

In some example embodiments, in response to the search query submitted by the user via the computing device 305, the query federator 310 aggregates search results for the submitted search query from a plurality of searchable resources 320 (e.g., searchable resource 320-1, searchable resource 320-2, . . . , searchable resource 320-N). In some example embodiments, the plurality of searchable resources 320 comprise plurality of heterogeneous data sets, such as a plurality of different search engines or a plurality of different file systems or a combination of different search engines and different file systems. In one example, the query federator 310 passes the search query submitted by the user via the computing device 305 to the searchable resources 320. Each one of the searchable resources 320 performs its own corresponding search using the search query and returns the results of its search to the query federator 310, which merges or concatenates the received search results from the searchable resources into a search results list, which is communicated for display on the computing device 305.

As previously discussed, the CPU consumption of the federated search scales directly with the number of searchable resources 320, negatively affecting the functioning of the cloud computing system architecture 300 more and more as the number of searchable resources 320 used in the federated search increases. In order to address this technical problem of CPU consumption without causing another technical problem of reduced accuracy and relevancy of the search results, in some example embodiments, the query federator 310 determines a select set of searchable resources 320 to use for the federated search based on interaction data of the user.

Figure 4:
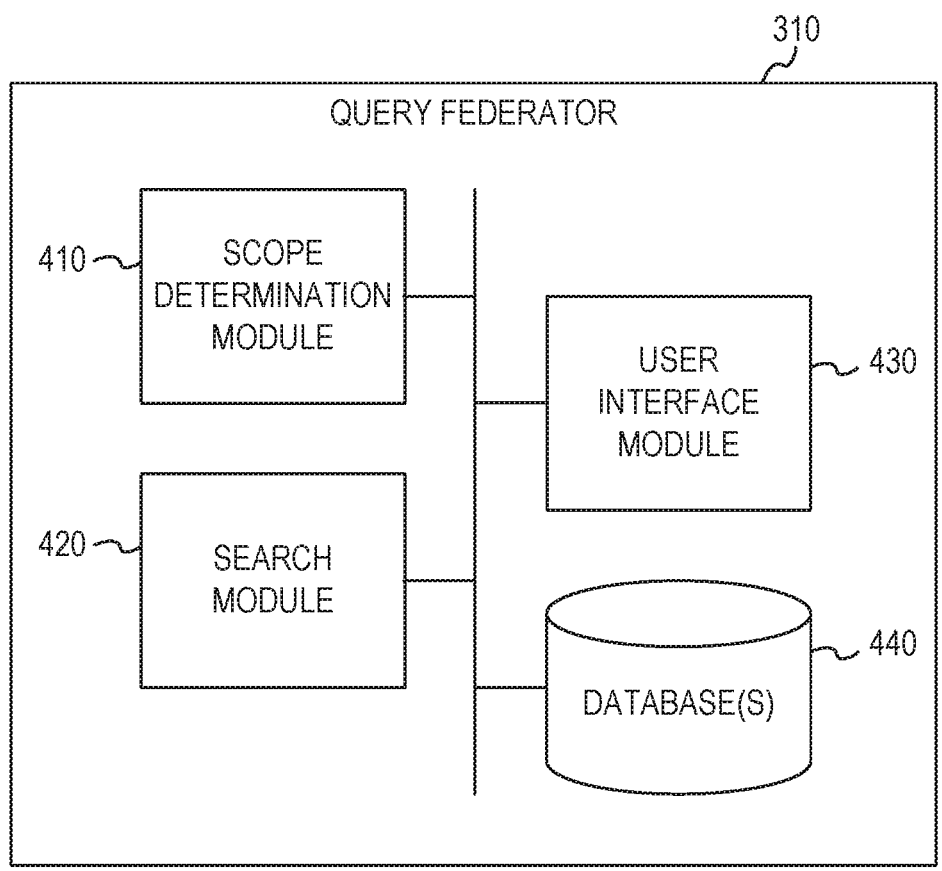
FIG. 4 is a block diagram of a query federator, in accordance with some example embodiments.

FIG. 4 is a block diagram of the query federator 310, in accordance with some example embodiments. In some embodiments, the query federator 310 comprises any combination of one or more of a scope determination module 410, a search module 420, a user interface module 430, and one or more database(s) 440. The modules 410, 420, and 430, and the database(s) 440 can reside on a computer system, or other machine, having a memory and at least one processor (not shown). In some embodiments, the modules 410, 420, and 430, and the database(s) 440 can be incorporated into the application server(s) 126 in FIG. 1. However, it is contemplated that other configurations of the modules 410, 420, and 430, and the database(s) 440, are also within the scope of the present disclosure.

In some example embodiments, one or more of the modules 410, 420, and 430 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 410, 420, 430 is configured to receive user input. For example, one or more of the modules 410, 420, and 430 can present one or more GUI elements (e.g., drop-down menu, selectable buttons, text field) with which a user can submit input. In some example embodiments, one or more of the modules 410, 420, and 430 is configured to perform various communication functions to facilitate the functionality described herein, such as by communicating with the computing device 305 and the searchable resources 320 via the network 114 using a wired or wireless connection.

In some example embodiments, the scope determination module 410 is configured to determine an initial search scope for a user based on interaction data of the user. The initial search scope is the default search scope used to define which searchable resources 320 are to be used in a federated search of a search query submitted by the user. For example, the initial search scope may comprise a selected subset of the total available searchable resources 320. In some example embodiments, the scope determination module 410 is configured to select the subset of searchable resources 320 based on the interaction data of the user. The selected subset of searchable resources 320 are then used as the default search scope for the federated search, such that the selected subset of searchable resources 320 are the only searchable resources 320 used for the federated search unless the user edits the search scope. For example, the initial search scope defined by the selected subset of searchable resources 320 may be displayed to the user when the user navigates to a search page prior to the federated search being performed. The user may then proceed with triggering federated search using the initial search scope, such as by selecting a selectable "SEARCH" or "SUBMIT" button after entering one or more query terms, or the user may change the search scope before triggering the federated search on the entered query term(s), such as by adding and/or removing searchable resources 320 from the search scope.

The interaction data used to determine the initial search scope indicates online activity of the user directed towards past search results of past search queries submitted by the user. In some example embodiments, a log file of past search queries submitted by the user is stored in the database(s) 440. The log file comprises indications of how the user interacted with the search results of the past search queries. For example, the log file may comprise interaction data indicating whether the user frequently narrowed down the search results by a distinct searchable resource 320, such as by filtering out search results obtained from a particular searchable resource 320. The scope determination module 410 may use a model to determine which searchable resources 320 to include in the initial search scope, weighting each searchable resource 320 for selection based on how many times the user filtered out search results from the searchable resource 320. For example, the scope determination module 410 may use a model that applies an inverse relationship between the number of times a searchable resource 320 has been removed from the search scope by the user and probability that the searchable resource 320 will be selected to be included in the subset of searchable resources 320 for the initial search scope (e.g., the more often the searchable resource 320 has been excluded from the search scope by the user, the less likely the searchable resource 320 is to be selected for inclusion in the initial search scope). In another example, the scope determination module 410 may use a threshold value to eliminate or exclude a searchable resource 320 from the initial search scope based on the number of times the searchable resource 320 has been removed from a search scope by the user (e.g., if the searchable resource 320 has been removed from the search scope five or more times, then the scope determination module 410 eliminates or excludes the searchable resource 320 from the initial search scope).

In some example embodiments, the log file additionally or alternatively comprises indications of for which searchable resources 320 did the user frequently navigate from their corresponding search results to a corresponding document. For example, the scope determination module 410 may use a model that applies a direct relationship between the number of times the user has selected to navigate from a search result obtained from the searchable resource 320 to a corresponding document of the search result and probability that the searchable resource 320 will be selected to be included in the subset of searchable resources 320 for the initial search scope (e.g., the more often the searchable resource 320 has been the source of search results selected for viewing or navigating to by the user, the more likely the searchable resource 320 is to be selected for inclusion in the initial search scope). In another example, the scope determination module 410 may use a threshold value to include a searchable resource 320 in the initial search scope based on the number of times any search results from the searchable resource 320 have been selected by the user (e.g., if the searchable resource 320 has been the source five times or more of search results that the user has selected for viewing or navigating to by the user, then the scope determination module 410 includes the searchable resource 320 from the initial search scope).

in some example embodiments, the scope determination module 410 is configured to determine the initial search scope for the user based on interaction data of one or more other users in addition to or as an alternative to the interaction data of the user. For example, the scope determination module 410 may access a log file of past search queries submitted by the other users. The log file may be stored in the database(s) 440 and comprise indications of how the other users interacted with the search results of the past search queries.

In some example embodiments, the scope determination module 410 is configured to select the subset of searchable resources 320 of the initial search scope based on one or more other factors other than the interaction data discussed above. For example, in some example embodiments, the scope determination module 410 is configured to select the subset of searchable resources 320 of the initial search scope based a role of the user. For example, the scope determination module 410 may determine a role of the user, such as by accessing a user profile of the user stored in the database(s) 340 based on user identification of the user, and then determine that user is not allowed to use certain searchable resources 320 in the federated search based on the determined role of the user or that the user is only allowed to use certain searchable resources 320 in the federated search based on the determined role of the user.

In some example embodiments, another factor that the scope determination module 410 uses in selecting the subset of searchable resources 320 of the initial search scope is a minimum number of searchable resources 320 to be used in the federated search. For example, the scope determination module 410 may enforce a requirement that at least five different searchable resources 320 are included in the initial search scope of the federated search, thereby preventing a search bubble in which the user is blind to valuable information from data sources outside a small scope of searchable resources 320. Additionally or alternatively, in some example embodiments, the scope determination module 410 uses a maximum number of searchable resources 320 to be used in the federated search in selecting the subset of searchable resources 320 of the initial search scope. For example, the scope determination module 410 may enforce a requirement no more than ten different searchable resources 320 are included in the initial search scope of the federated search, thereby preventing an excessive search scope that risks nullifying the benefits of the use of the interaction data in determining the initial search scope.

In some example embodiments, another factor that the scope determination module 410 uses in selecting the subset of searchable resources 320 of the initial search scope is CPU consumption values. For example, the scope determination module 410 may select the subset of searchable resources 320 for the initial search scope based on corresponding CPU consumption values for the searchable resources 320. In some example embodiments, the CPU consumption values represent usage by the corresponding searchable resource 320 of processing sources or the amount of work handled by a corresponding CPU of the searchable resource 320. The CPU consumption values for each searchable resource 320 may be logged by the query federator 310 and stored in the database(s) 440. The scope determination module 410 may access the CPU consumption values for the searchable resources 320 and then override the initial search scope determined based on the interaction data by removing from the initial search scope any searchable resources 320 that have a corresponding CPU consumption value that satisfies a particular removal criteria (e.g., the CPU consumption value exceeds a threshold CPU consumption value) and/or includes in the initial search scope any searchable resources 320 that have a corresponding CPU consumption value that satisfies a particular inclusion criteria (e.g., the CPU consumption value is below a threshold CPU consumption value). In some example embodiments, a model used by the scope determination module 410 in selecting the subset of searchable resources 320 of the initial search scope may weight the searchable resources 320 based on their corresponding CPU consumption values, decreasing the probability that a searchable resource 320 will be selected as the corresponding CPU consumption of the searchable resource 320 increases, and increasing the probability that the searchable resource 320 will be selected as the corresponding CPU consumption of the searchable resource 320 decreases.

in some example embodiments, another factor that the scope determination module 410 uses in selecting the subset of searchable resources 320 of the initial search scope is the response times for the subset of searchable resources 320. The scope determination module 410 may access the response times for the searchable resources 320 and then override the initial search scope determined based on the interaction data by removing from the initial search scope any searchable resources 320 that have a corresponding response time that satisfies a particular removal criteria (e.g., the response time exceeds a threshold response time) and/or includes in the initial search scope any searchable resources 320 that have a corresponding response time that satisfies a particular inclusion criteria (e.g., the response time is below a threshold response time). In some example embodiments, a model used by the scope determination module 410 in selecting the subset of searchable resources 320 of the initial search scope may weight the searchable resources 320 based on their corresponding response times, decreasing the probability that a searchable resource 320 will be selected as the corresponding response time of the searchable resource 320 increases, and increasing the probability that the searchable resource 320 will be selected as the corresponding response time of the searchable resource 320 decreases.

In some example embodiments, the scope determination module 410 is configured to determine the initial search scope for the user based on any combination of one or more of the factors discussed above (interaction data of the user, interaction data of other users, role of the user, minimum number of searchable resources, maximum number of searchable resources, CPU consumption values, response times). For example, in some example embodiments, the scope determination module 410 employs a score-based algorithm that generates a score for each available searchable resource based on an aggregation of any combination of the above-discussed factors, and then selects the searchable resources for the initial search scope based on the scores.

In some example embodiments, the search module 420 is configured to perform a federated search for a current search query using the initial search scope, with the federated search for the current search query being restricted to only the subset of searchable resources 320 of the initial search scope, and then generate current search results for the current search query based on the performing of the federated search. For example, the search module 420 may transmit the current search query submitted by the user via the computing device 305 to the subset of searchable resources 320 of the initial search scope. Each one of the subset of searchable resources 320 of the initial search scope performs its own corresponding search using the search query and returns the results of its search to the search module 420, which merges or concatenates the received search results from the searchable resources into search results to be displayed to the user.

In some example embodiments, the user interface module 430 is configured to cause the generated current search results to be displayed on the computing device 305 of the user. For example, the user interface module 430 may transmit the generates current search results to the computing device 305 of the user for display on the computing device 305.

In some example embodiments, the scope determination module 410 is configured to determine the initial search scope of the user periodically (e.g., every seven days) independent of receiving a search query from the user. For example, the scope determination module 410 may determine the initial search scope of the user as part of a periodic search scope determination process prior to the user submitting the current search query, store the initial search scope of the user in the database(s) 440 in association with the user, and then retrieve the initial search scope of the user in response to, or otherwise based on, receiving the current search query submitted by the user. The scope determination module 410 may then provide the retrieved initial search scope to the search module 420 for use in performing the federated search for the current search query.

In some example embodiments, the scope determination module 410 is configured to determine the initial search scope of the user in response to the user submitting the current search query. For example, the scope determination module 410 may retrieve the interaction data of the user and select the subset of searchable resources 320 of the initial search scope, as previously discussed, in response to or otherwise based on receiving the current search query submitted by the user.

in some example embodiments, the user interface module 430 is configured to record online activity of the user directed towards one or more of the generated current search results for the current search query as interaction data to be used in subsequent determinations of the initial search scope for the user. For example, the user interface module 430 may receive an indication of online activity of the user directed towards one or more of the generated current search results displayed on the computing device 305 of the user (e.g., a user selection to navigate to a corresponding document of a generated current search result or a user selection to filter out any generated current search results corresponding to a particular searchable resource 320), and to store the indication of the online activity directed towards the generated current search result(s) as additional interaction data in the database(s) 440 in association with the user. The scope determination module 410 may then subsequently determine another initial search scope for the user based on the additional interaction data of the user, and the search module 420 may perform another federated search for another current search query using the updated initial search scope, and generate another set of current search results for the other current search query based on the other federated search. The user interface module 430 may then cause the other set of generated current search results to be displayed on the computing device 305 of the user. In some example embodiments, the query federator 310 is configured to continue updating the initial search scope of the user based on these repeated determinations, searches, and receipts of interaction data of the user.

Figure 5:
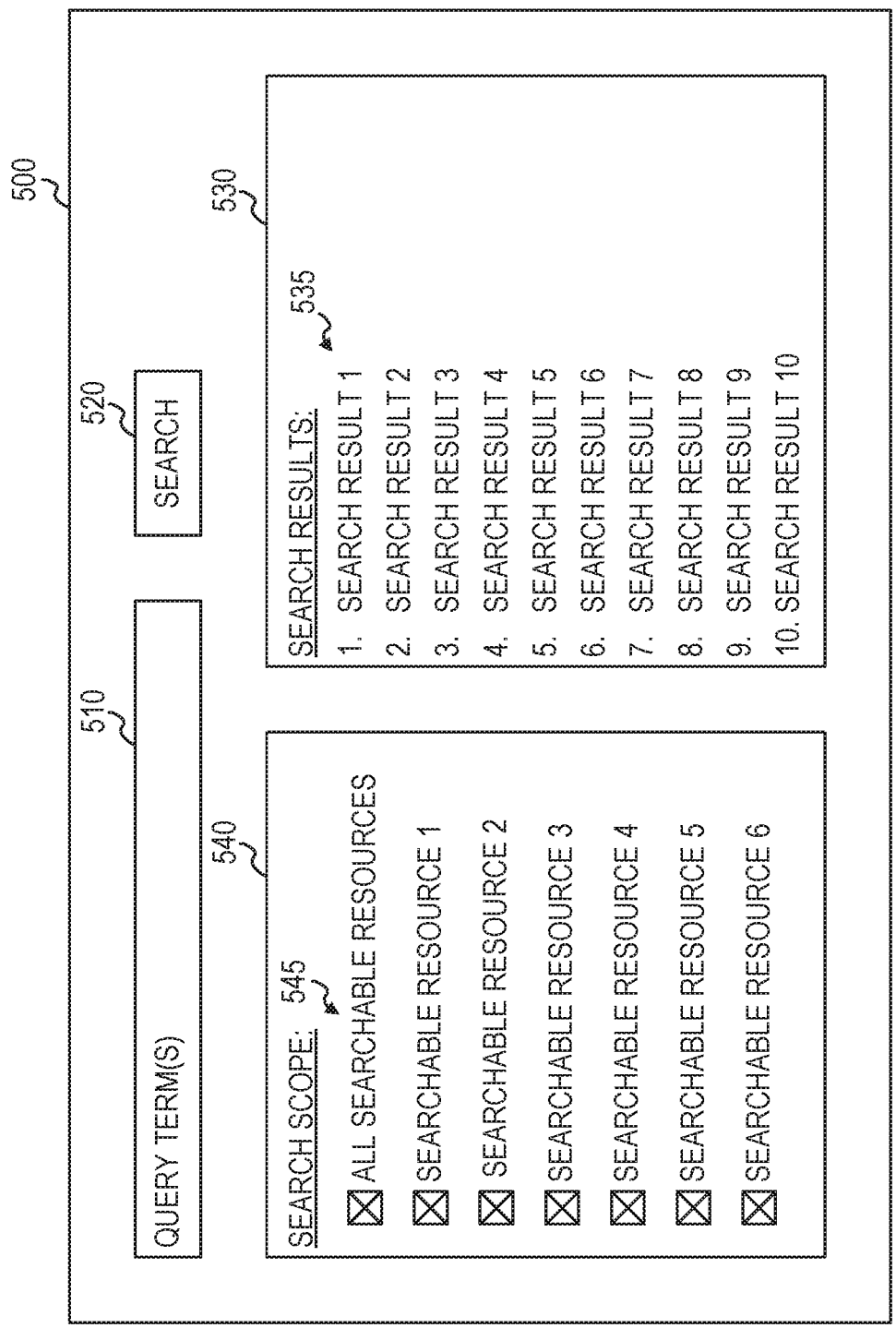
FIG. 5 illustrates a graphical user interface (GUI) in which search results of a federated search are provided, in accordance with some example embodiments.

FIG. 5 illustrates a graphical user interface (GUI) 500 in which search results 535 of a federated search are provided, in accordance with some example embodiments. In FIG. 5, the GUI 500 includes one or more user interface elements configured to receive one or more query terms from the user, such as a search field 510, and to trigger the submission of the query term(s) as a search query to the query federator 310, such as a selectable "SEARCH" BUTTON 520. In response to the submission of the search query, the query federator 310 performs the federated search, as previously discussed, and provides the resulting search results 535 in a section 530 of the GUI 500 dedicated to search results. In some example embodiments, the GUI also includes one or more selectable user interface elements 545 configured to enable the user to edit the search scope of the federated search. In one example, a plurality of selectable user interface elements 545 are provided within a section 530 of the GUI 500 dedicated to the search scope, with each one of the plurality of selectable user interface elements 545 corresponding to a different search scope. For example, each selectable user interface element 545 may correspond to a different searchable resource 320. Additionally, one of the selectable user interface elements 545 may correspond to a selection of all of the searchable resources 320. In FIG. 5, the search scope includes all of the available searchable resources 320, as indicated by the selection of the check box for "ALL SEARCHABLE RESOURCES," as well as the resulting selection of the corresponding check boxes for all of the listed searchable resources ("SEARCHABLE RESOURCE 1," "SEARCHABLE RESOURCE 2" . . . "SEARCHABLE RESOURCE 6").

Figure 6:
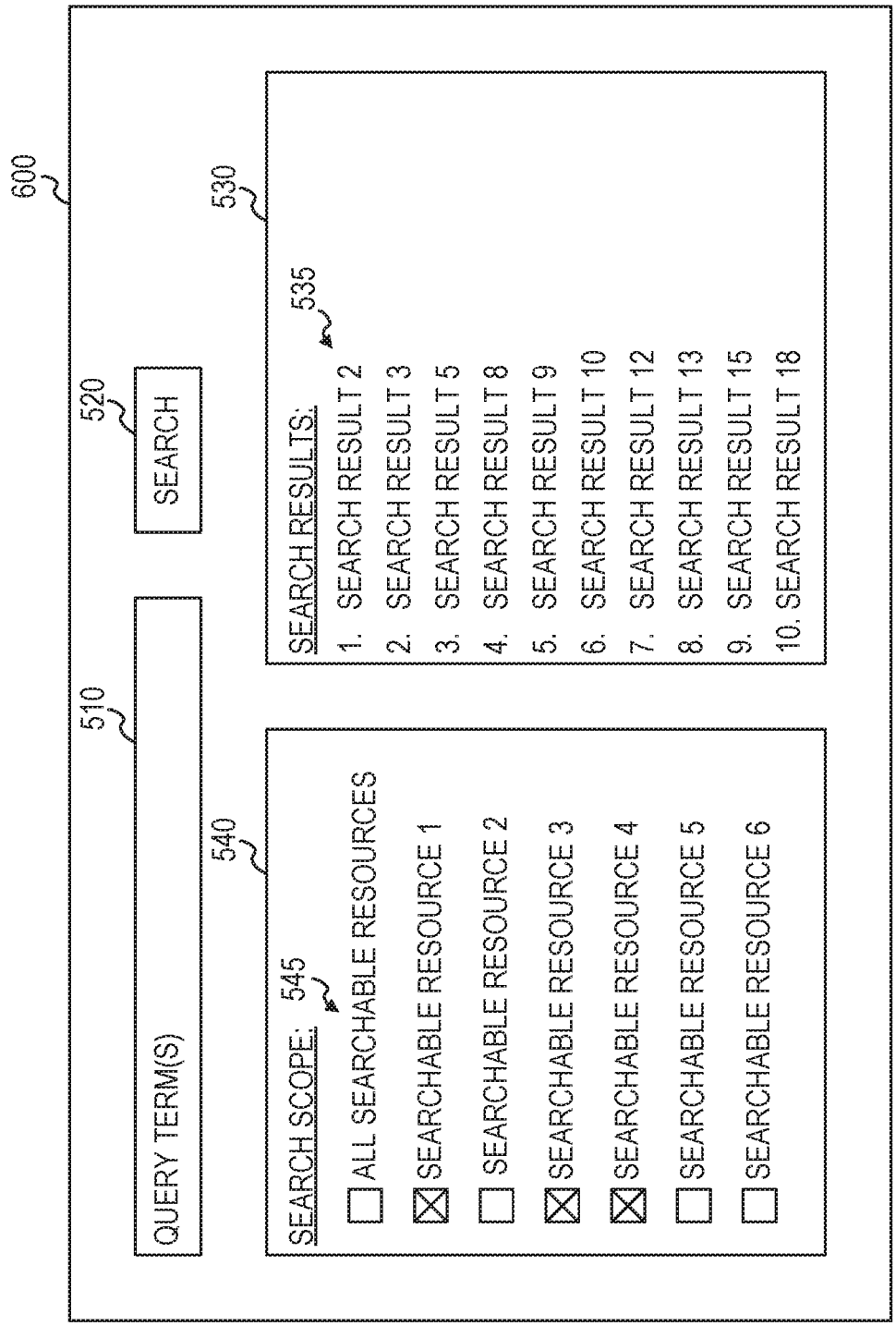
FIG. 6 illustrates another GUI in which search results of a federated search are provided, in accordance with some example embodiments.

By editing the search scope using the selectable user interface elements 545, the user may affect the search results 535, as the searchable resources 320 used by the search module 420 changes accordingly. FIG. 6 illustrates another GUI 600 in which search results 535 of a federated search are provided, in accordance with some example embodiments. In FIG. 6, the user has de-selected the selection of "ALL SEARCHABLE RESOURCES" from FIG. 5, and has specifically selected only three searchable resources— "SEARCHABLE RESOURCE 1," "SEARCHABLE RESOURCE 3," and "SEARCHABLE RESOURCE 4." As a result, the initial search scope from FIG. 5 has been narrowed, removing the other four searchable resources from the search scope. A record of this removal of the other four searchable resources from the search scope may be stored as interaction data of the user in the database(s) 340 for subsequent use in the determination of the initial search scope of the user. Additionally, a selection of one of the search results 535 to navigate to a corresponding document (e.g., web page) of the selected search result 535, along with the corresponding searchable resource 320 of the selected search result(s), may also be stored as interaction data of the user in the database(s) 340 for subsequent use in the determination of the initial search scope of the user.

Figure 7:
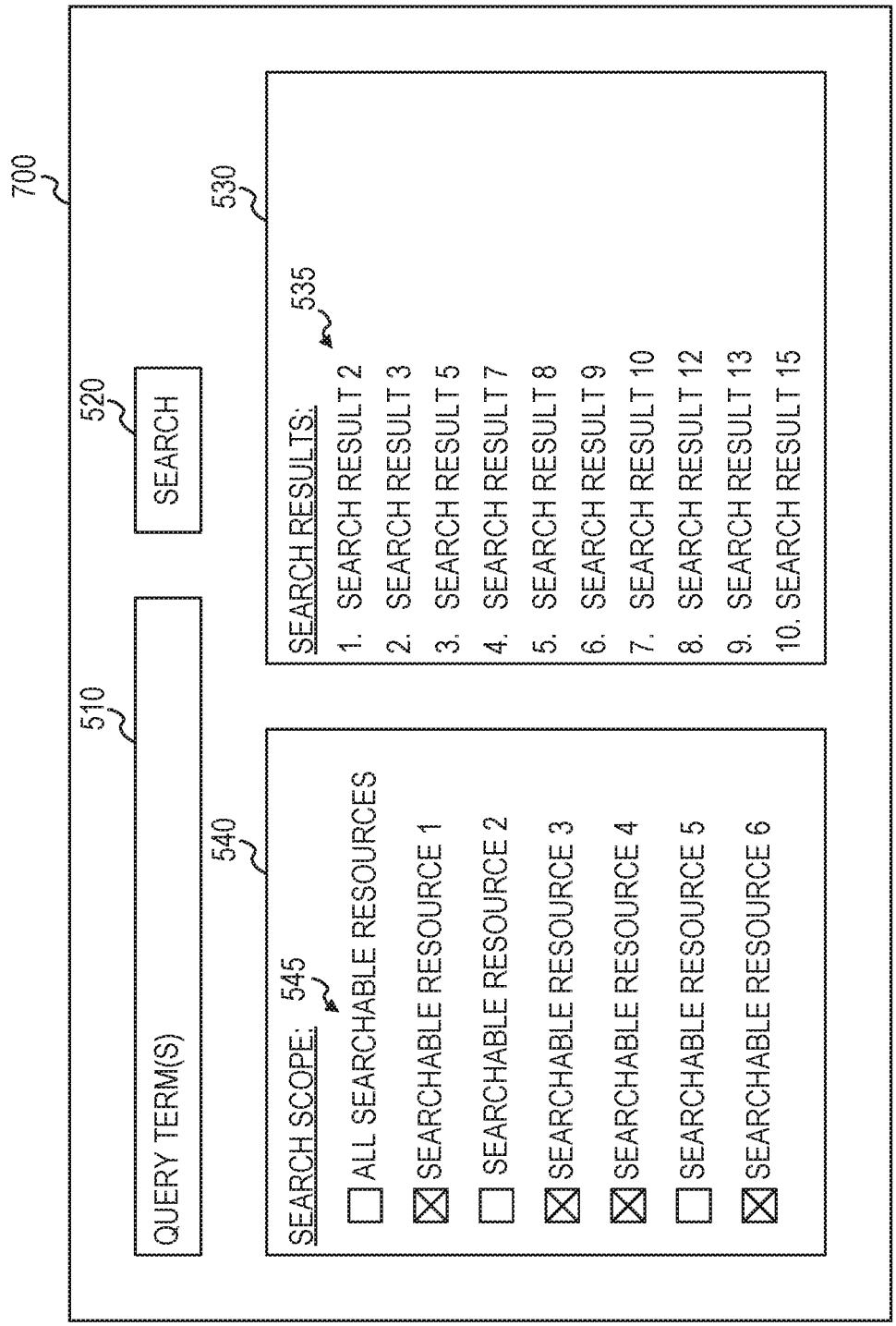
FIG. 7 illustrates yet another GUI in which search results of a federated search are provided, in accordance with some example embodiments.

FIG. 7 illustrates yet another GUI 700 in which search results 535 of a federated search are provided, in accordance with some example embodiments. In FIG. 7, the user has selected one more selectable user interface element 545 to add another searchable resource 320 to the search scope shown in FIG. 6. In FIG. 7, the user has added "SEARCHABLE RESOURCE 6" to be included with "SEARCHABLE RESOURCE 1," "SEARCHABLE RESOURCE 3," and "SEARCHABLE RESOURCE 4" in the search scope. As a result, the initial search scope from FIG. 6 has been broadened. A record of this addition of SEARCHABLE RESOURCE 6 to the search scope may be stored as interaction data of the user in the database(s) 340 for subsequent use in the determination of the initial search scope of the user.

Figure 8:
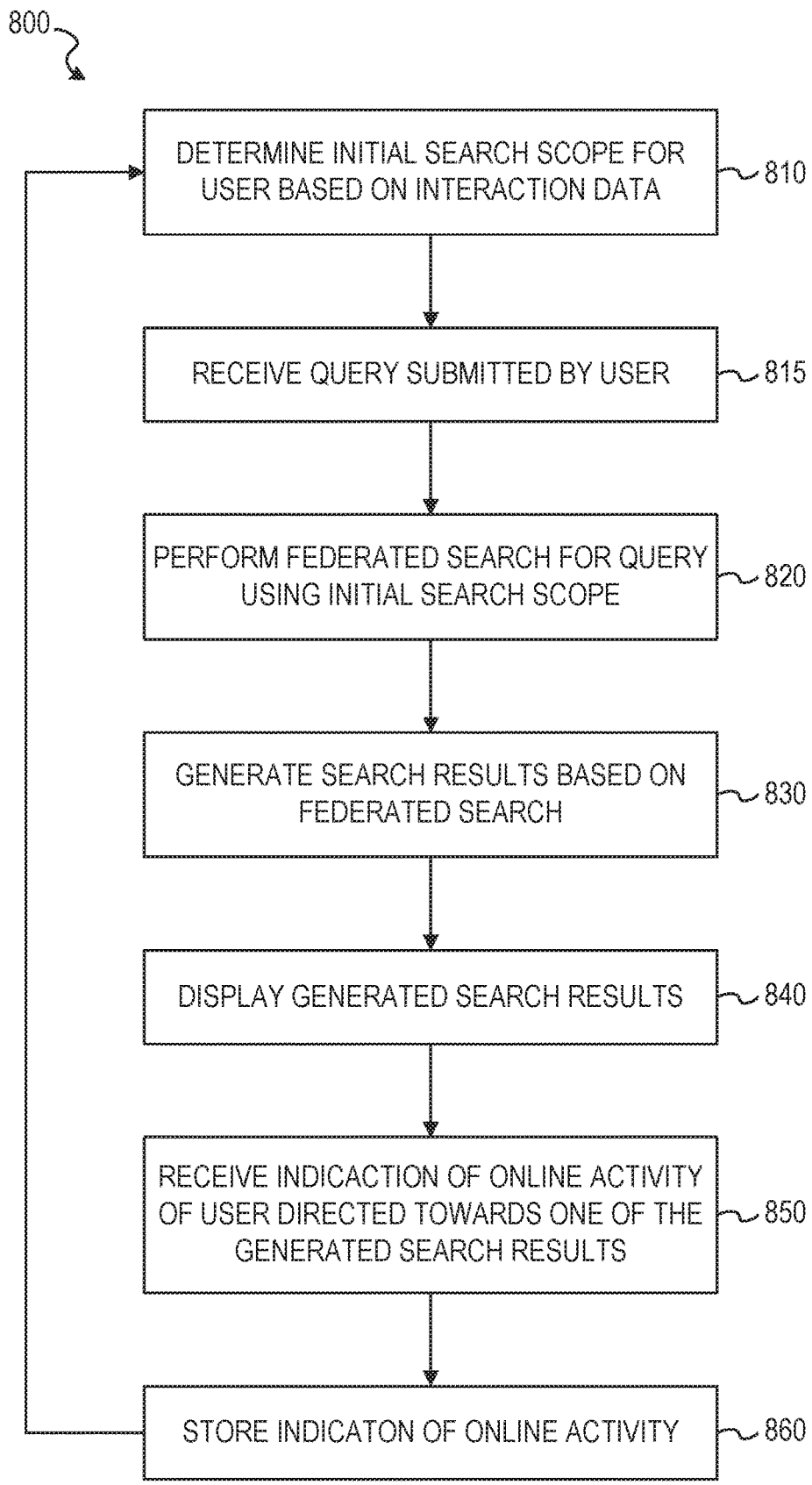
FIG. 8 is a flowchart illustrating a method of reducing CPU consumption in a federated search, in accordance with some example embodiments.

FIG. 8 is a flowchart illustrating a method 800 of reducing CPU consumption in a federated search, in accordance with some example embodiments. The method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the query federator 310 of FIG. 3, or any combination of one or more of its modules, as described above.

At operation 810, the query federator 410 determines an initial search scope for the user based on interaction data of the user. In some example embodiments, the determining the initial search scope comprises selecting a subset of searchable resources 320 from a plurality of searchable resources 320 based on the interaction data of the user, and the initial search scope is defined by the selected subset of searchable resources 320, with the interaction data indicating online activity of the user directed towards past search results of past search queries submitted by the user. In some example embodiments, the plurality of searchable resources comprises a plurality of search engines or a plurality of file systems.

In some example embodiments, the online activity comprises narrowing down the past search results of the past search queries by one or more searchable resources. In some example embodiments, the narrowing down the past search results comprises removing all search results from the past search results that were retrieved from the one or more searchable resources. In some example embodiments, the narrowing down the past search results comprises removing all search results from the past search results that were not retrieved from the one or more searchable resources.

In some example embodiments, the online activity comprises, for each one of the past search results, navigating to a document corresponding to the past search result via a user selection by the user of a selectable link corresponding to the past search result, the past search result having been retrieved from one of the subset of searchable resources.

In some example embodiments, the selecting the subset of searchable resources is further based on a role of the user. In some example embodiments, the selecting the subset of searchable resources comprises restricting a number of searchable resources defining the subset of searchable resources to being within a range of a minimum value and a maximum value, with the minimum value being greater than one and the maximum value being less than a total number of searchable resources in the plurality of searchable resources. In some example embodiments, the selecting the subset of searchable resources is further based on corresponding central processing unit (CPU) utilization values for the subset of searchable resources. In some example embodiments, the selecting the subset of searchable resources is further based on corresponding response times for the subset of searchable resources.

At operation 820, the query federator 410 performs a federated search for a current search query using the initial search scope. In some example embodiments, the federated search for the current search query is restricted to only the subset of searchable resources 320. At operation 830, the query federator 410 generates current search results for the current search query based on the federated search performed at operation 820. At operation 840, the query federator 410 causes the generated current search results to be displayed on the computing device 305 of the user.

At operation 850, the query federator 410 receives an indication of online activity of the user directed towards one of the generated current search results displayed on the computing device 305 of the user. At operation 860, the query federator 410 stores the indication of the online activity directed towards the generated current search result(s) as additional interaction data in the database(s) 440 in association with the user. The method 800 then returns to operation 810, where the query federator 410 determines another initial search scope for the user based on the additional interaction data of the user.

In some example embodiments, the query federator 410 determines the initial search scope of the user as part of a periodic search scope determination process prior to the user submitting the current search query. Accordingly, in some example embodiments, the query federator 410 determines the initial search scope for the user at operation 810, then subsequently receives the current search query submitted by the user at operation 815, and then subsequently performs the federated search for the current search query using the determined initial search scope at operation 820.

It is contemplated that any of the other features described within the present disclosure can be incorporated into method 800.

Figure 9:
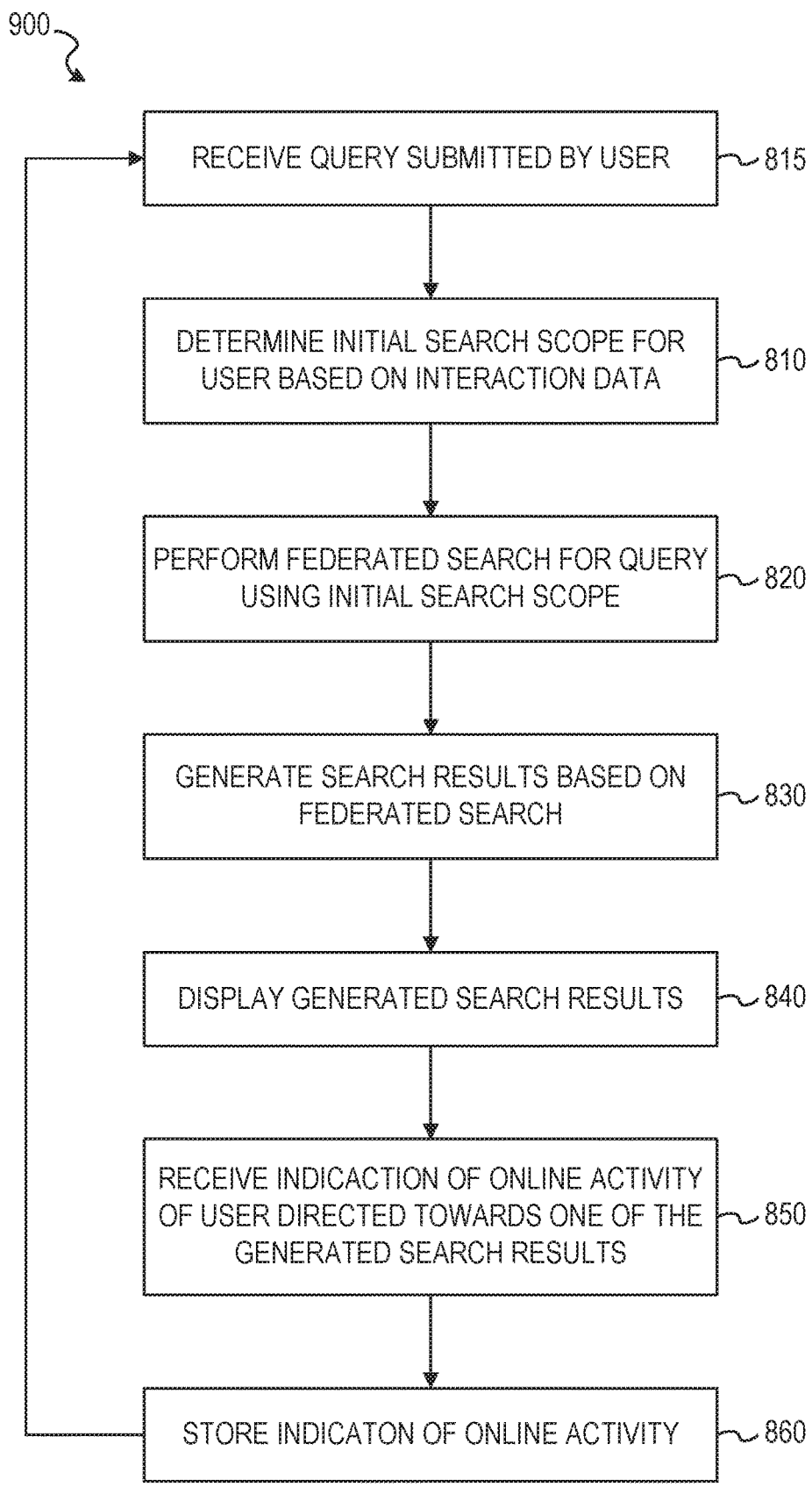
FIG. 9 is a flowchart illustrating another method of reducing CPU consumption in a federated search, in accordance with some example embodiments.

FIG. 9 is a flowchart illustrating another method 900 of reducing CPU consumption in a federated search, in accordance with some example embodiments. The method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the query federator 310 of FIG. 3, or any combination of one or more of its modules, as described above.

The method 900 comprises the same operations and flow as the method 800, except that, in the method 900, the query federator 410 performs the operation 810 of determining the initial search scope of the user in response to the user submitting the current search query. Accordingly, in some example embodiments, the query federator 410 receives the current search query submitted by the user at operation 815, then subsequently determines the initial search scope of the user at operation 810, and then subsequently performs the federated search for the current search query using the determined initial search scope at operation 820.

It is contemplated that any of the other features described within the present disclosure can be incorporated into method 900.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It wild be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
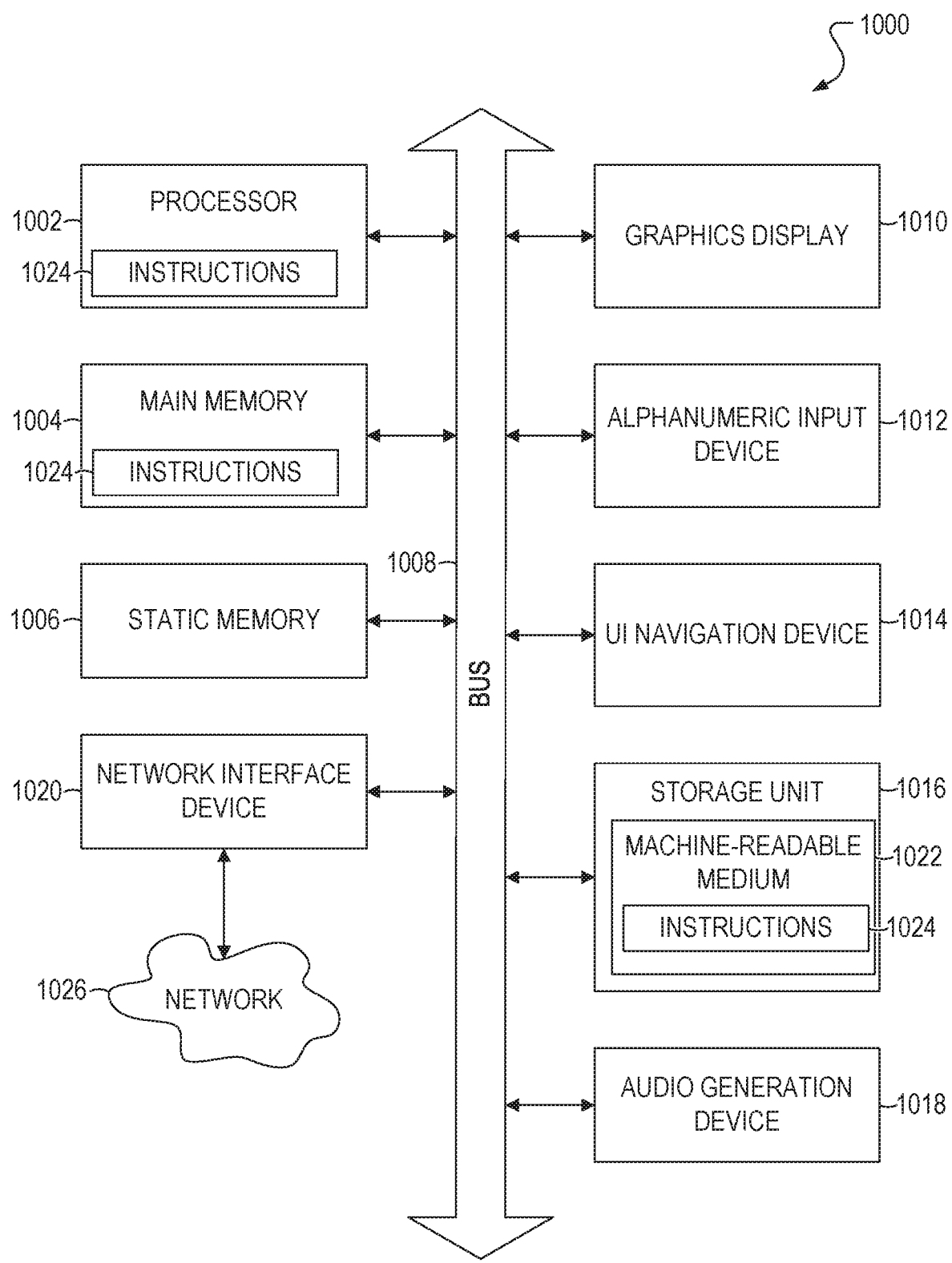
FIG. 10 is a block diagram of an example computer system on which methodologies described herein can be executed, in accordance with some example embodiments.

FIG. 10 is a block diagram of a machine in the example form of a computer system 1000 within which instructions 1024 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client n network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

The following numbered examples are embodiments.

1. A computer-implemented method comprising:
    determining, by at least one hardware processor, an initial search scope for a user based on interaction data of the user, the determining the initial search scope comprising selecting a subset of searchable resources from a plurality of searchable resources based on the interaction data of the user, the initial search scope being defined by the selected subset of searchable resources, the interaction data indicating online activity of the user directed towards past search results of past search queries submitted by the user;
    performing, by the at least one hardware processor, a federated search for a current search query using the initial search scope, the federated search for the current search query being restricted to only the subset of searchable resources;
    generating, by the at least one hardware processor, current search results for the current search query based on the performing of the federated search; and
    causing, by the at least one hardware processor, the generated current search results to be displayed on a computing device of the user.

2. The computer-implemented method of example 1, wherein the plurality of searchable resources comprises a plurality of search engines or a plurality of file systems.

3. The computer-implemented method of example 1 or example 2, wherein the online activity comprises narrowing down the past search results of the past search queries by one or more searchable resources.

4. The computer-implemented method of example 3, wherein the narrowing down the past search results comprises removing all search results from the past search results that were retrieved from the one or more searchable resources.

5. The computer-implemented method of example 3, wherein the narrowing down the past search results comprises removing all search results from the past search results that were not retrieved from the one or more searchable resources.

6. The computer-implemented method of any one of examples 1 to 5, wherein the online activity comprises, for each one of the past search results, navigating to a document corresponding to the past search result via a user selection by the user of a selectable link corresponding to the past search result, the past search result having been retrieved from one of the subset of searchable resources.

7. The computer-implemented method of any one of examples 1 to 6, wherein the determining the initial search scope of the user is performed prior to the user submitting the current search query as part of a periodic search scope determination process, the determining the initial search scope of the user comprising storing the initial search scope of the user in a database in association with the user, and the performing the federated search for the current search query comprises retrieving the initial search scope.

8. The computer-implemented method of any one of examples 1 to 7, wherein the determining the initial search scope of the user is performed in response to the user submitting the current search query.

9. The computer-implemented method of any one of examples 1 to 8, wherein the computer-implemented method further comprises:
receiving, by the at least one hardware processor, an indication of online activity of the user directed towards one of the generated current search results displayed on the computing device of the user;
storing, by the at least one hardware processor, the indication of the online activity directed towards the one of the generated current search results as additional interaction data in a database in association with the user;
determining, by the at least one hardware processor, another initial search scope for the user, the other initial search scope being defined by another subset of searchable resources that have been selected from the plurality of searchable resources based on the additional interaction data of the user;
performing, by the at least one hardware processor, another federated search for another current search query using the other initial search scope, the other federated search for the other current search query being restricted to only the other subset of searchable resources;
generating, by the at least one hardware processor, another set of current search results for the other current search query based on the performing of the other federated search; and
causing, by the at least one hardware processor, the other set of generated current search results to be displayed on the computing device of the user.

10. The computer-implemented method of any one of examples 1 to 9, wherein the selecting the subset of searchable resources is further based on a role of the user.

11. The computer-implemented method of any one of examples 1 to 10, wherein the selecting the subset of searchable resources comprises restricting a number of searchable resources defining the subset of searchable resources to being within a range of a minimum value and a maximum value, the minimum value being greater than one and the maximum value being less than a total number of searchable resources in the plurality of searchable resources.

12. The computer-implemented method of any one of examples 1 to 11, wherein the selecting the subset of searchable resources is further based on corresponding central processing unit (CPU) consumption values for the subset of searchable resources.

13. The computer-implemented method of any one of examples 1 to 12, wherein the selecting the subset of searchable resources is further based on corresponding response times for the subset of searchable resources.

14. A system comprising:
at least one processor; and
a non-transitory computer-readable medium storing executable instructions that, when executed, cause the at least one processor to perform the method of any one of examples 1 to 13.

15. A non-transitory machine-readable storage medium, tangibly embodying a set of instructions that, when executed by at least one processor, causes the at least one processor to perform the method of any one of examples 1 to 13.

16. A machine-readable medium carrying a set of instructions that, when executed by at least one processor, causes the at least one processor to carry out the method of any one of examples 1 to 13.

Each of the features and teachings disclosed herein can be utilized separately or in conjunction with other features and teachings to provide a system and method for increasing accessibility of data across different environments of a computer system architecture. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving, by at least one hardware processor, indications of online activity of a user directed towards past search results of past search queries submitted by a user, the online activity of the user comprising the user narrowing down the past search results of the past search queries by one or more searchable resources;
storing, by the at least one hardware processor, the indications of the online activity directed towards the past search results as interaction data in a database in association with the user;
determining, by the at least one hardware processor, an initial search scope for the user based on the stored interaction data of the user, the determining the initial search scope comprising selecting a subset of searchable resources from a plurality of searchable resources based on the interaction data of the user, the one or more searchable resources being excluded from the selected subset of searchable resources based on the stored indications of the user narrowing down the past search results of the past search queries by the one or more searchable resources, the initial search scope being defined by the selected subset of searchable resources;
performing, by the at least one hardware processor, a federated search for a current search query using the initial search scope, the federated search for the current search query being restricted to only the subset of searchable resources;
generating, by the at least one hardware processor, current search results for the current search query based on the performing of the federated search; and
causing, by the at least one hardware processor, the generated current search results to be displayed on a computing device of the user.

2. The computer-implemented method of claim 1, wherein the plurality of searchable resources comprises a plurality of search engines or a plurality of file systems.

3. The computer-implemented method of claim 1, wherein the user narrowing down the past search results comprises the user removing all search results from the past search results that were retrieved from the one or more searchable resources.

4. The computer-implemented method of claim 1, wherein the online activity comprises, for each one of the past search results, navigating to a document corresponding to the past search result via a user selection by the user of a selectable link corresponding to the past search result, the past search result having been retrieved from one of the subset of searchable resources.

5. The computer-implemented method of claim 1, wherein the determining the initial search scope of the user is performed prior to the user submitting the current search query as part of a periodic search scope determination process, the determining the initial search scope of the user comprising storing the initial search scope of the user in a database in association with the user, and the performing the federated search for the current search query comprises retrieving the stored initial search scope from the database.

6. The computer-implemented method of claim 1, wherein the determining the initial search scope of the user is performed in response to the user submitting the current search query.

7. The computer-implemented method of claim 1, further comprising:
receiving, by the at least one hardware processor, an indication of online activity of the user directed towards one of the generated current search results displayed on the computing device of the user;
storing, by the at least one hardware processor, the indication of the online activity directed towards the one of the generated current search results as additional interaction data in a database in association with the user;
determining, by the at least one hardware processor, another initial search scope for the user, the other initial search scope being defined by another subset of searchable resources that have been selected from the plurality of searchable resources based on the additional interaction data of the user;
performing, by the at least one hardware processor, another federated search for another current search query using the other initial search scope, the other federated search for the other current search query being restricted to only the other subset of searchable resources;
generating, by the at least one hardware processor, another set of current search results for the other current search query based on the performing of the other federated search; and
causing, by the at least one hardware processor, the other set of generated current search results to be displayed on the computing device of the user.

8. The computer-implemented method of claim 1, wherein the selecting the subset of searchable resources is further based on a role of the user.

9. The computer-implemented method of claim 1, wherein the selecting the subset of searchable resources comprises restricting a number of searchable resources defining the subset of searchable resources to being within a range of a minimum value and a maximum value, the minimum value being greater than one and the maximum value being less than a total number of searchable resources in the plurality of searchable resources.

10. The computer-implemented method of claim 1, wherein the selecting the subset of searchable resources is further based on corresponding central processing unit (CPU) consumption values for the subset of searchable resources.

11. The computer-implemented method of claim 1, wherein the selecting the subset of searchable resources is further based on corresponding response times for the subset of searchable resources.

12. A system comprising:
at least one processor; and
a non-transitory computer-readable medium storing executable instructions that, when executed, cause the at least one processor to perform operations comprising:
receiving indications of online activity of a user directed towards past search results of past search queries submitted by a user, the online activity of the user comprising the user narrowing down the past search results of the past search queries by one or more searchable resources;
storing the indications of the online activity directed towards the past search results as interaction data in a database in association with the user;
determining an initial search scope for the user based on interaction data of the user, the determining the initial search scope comprising selecting a subset of searchable resources from a plurality of searchable resources based on the interaction data of the user, the one or more searchable resources being excluded from the selected subset of searchable resources based on the stored indications of the user narrowing down the past search results of the past search queries by the one or more searchable resources, the initial search scope being defined by the selected subset of searchable resources;
performing a federated search for a current search query using the initial search scope, the federated search for the current search query being restricted to only the subset of searchable resources;
generating current search results for the current search query based on the performing of the federated search; and
causing the generated current search results to be displayed on a computing device of the user.

13. The system of claim 12, wherein the plurality of searchable resources comprises a plurality of search engines or a plurality of file systems.

14. The system of claim 12, wherein the user narrowing down the past search results comprises the user removing all search results from the past search results that were retrieved from the one or more searchable resources.

15. The system of claim 12, wherein the online activity comprises, for each one of the past search results, navigating to a document corresponding to the past search result via a user selection by the user of a selectable link corresponding to the past search result, the past search result having been retrieved from one of the subset of searchable resources.

16. A non-transitory machine-readable storage medium, tangibly embodying a set of instructions that, when executed by at least one processor, causes the at least one processor to perform operations comprising:
receiving indications of online activity of a user directed towards past search results of past search queries submitted by a user, the online activity of the user comprising the user narrowing down the past search results of the past search queries by one or more searchable resources;
storing the indications of the online activity directed towards the past search results as interaction data in a database in association with the user;
determining an initial search scope for the user based on interaction data of the user, the determining the initial search scope comprising selecting a subset of searchable resources from a plurality of searchable resources based on the interaction data of the user, the one or more searchable resources being excluded from the selected subset of searchable resources based on the stored indications of the user narrowing down the past search results of the past search queries by the one or more searchable resources, the initial search scope being defined by the selected subset of searchable resources;
performing a federated search for a current search query using the initial search scope, the federated search for the current search query being restricted to only the subset of searchable resources;

generating current search results for the current search query based on the performing of the federated search; and causing the generated current search results to be displayed on a computing device of the user.

17. The non-transitory machine-readable medium of claim 16, wherein the plurality of searchable resources comprises a plurality of search engines or a plurality of file systems.

18. The non-transitory machine-readable medium of claim 16, wherein the user narrowing down the past search results comprises the user removing all search results from the past search results that were retrieved from the one or more searchable resources.

19. The non-transitory machine-readable medium of claim 16, wherein the online activity comprises, for each one of the past search results, navigating to a document corresponding to the past search result via a user selection by the user of a selectable link corresponding to the past search result, the past search result having been retrieved from one of the subset of searchable resources.

20. The non-transitory machine-readable medium of claim 16, wherein the determining the initial search scope of the user is performed prior to the user submitting the current search query as part of a periodic search scope determination process, the determining the initial search scope of the user comprising storing the initial search scope of the user in a database in association with the user, and the performing the federated search for the current search query comprises retrieving the stored initial search scope from the database.

\* \* \* \* \*